Frank Griffin
C. R. Jones
Inventors

By Horace C. Chandlee
Attorney

UNITED STATES PATENT OFFICE 1,930,618

LIQUID MEASURING DEVICE

Caradoc R. Jones and Frank Griffin, Cleveland, Ohio

Application August 13, 1930, Serial No. 475,113
Renewed March 1, 1933

1 Claim. (Cl. 221—95)

This invention relates to new and useful improvements in measuring devices, and particularly to devices for measuring liquids.

The principal object of the invention is to provide a device which is especially adapted for measuring water, for use in connection with concrete mixing machines, whereby accurate charges of water may be discharged into the dry components of the mixture.

Another object is to provide a device of this character which can be quickly and easily filled, and as quickly and easily emptied.

Other objects and advantages will be apparent from the following description when taken in connection with the accompanying drawings.

Figure 1:
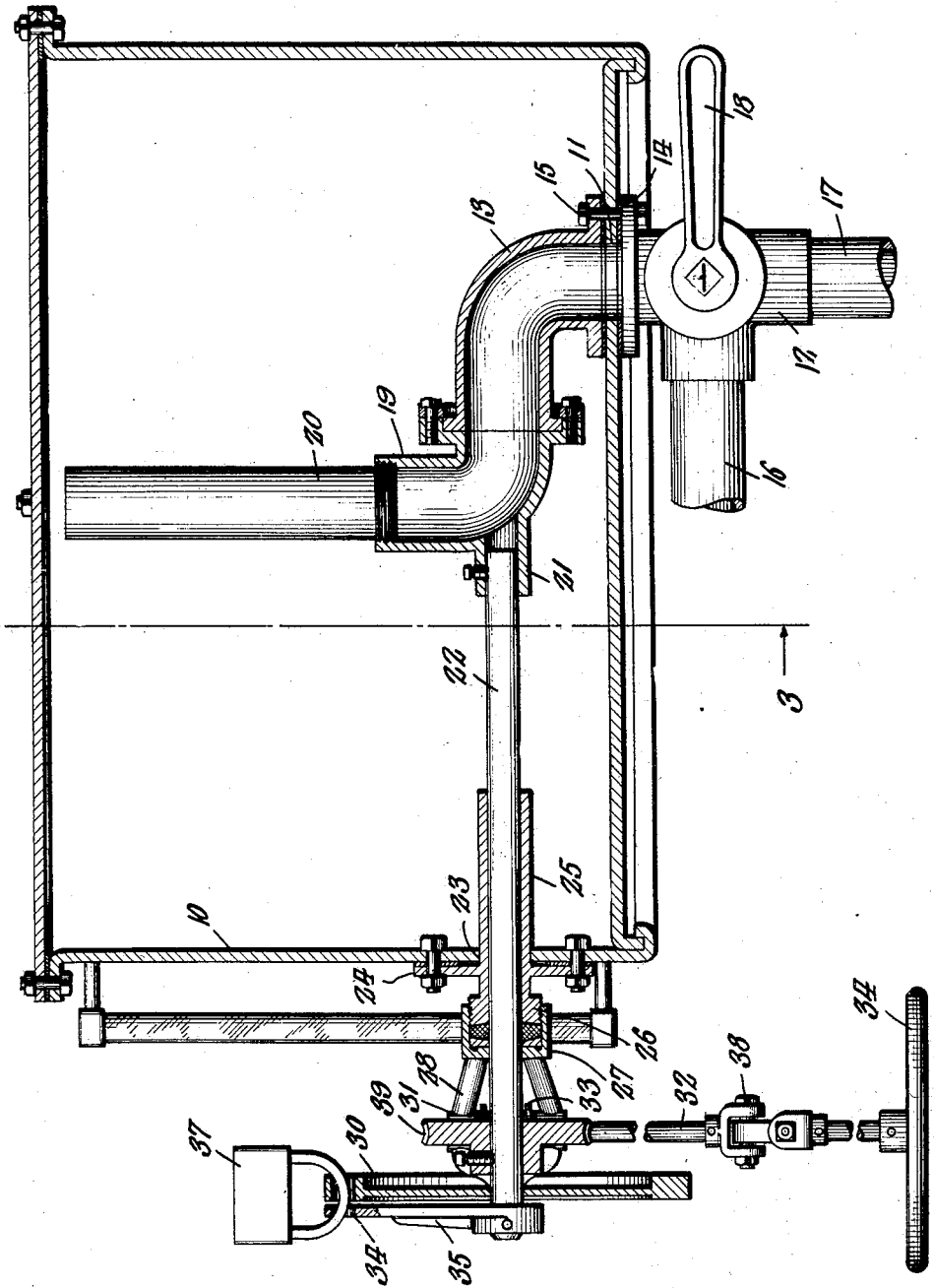
Figure 1 is a vertical sectional view through a water tank made in accordance with the present invention.
Figure 2:
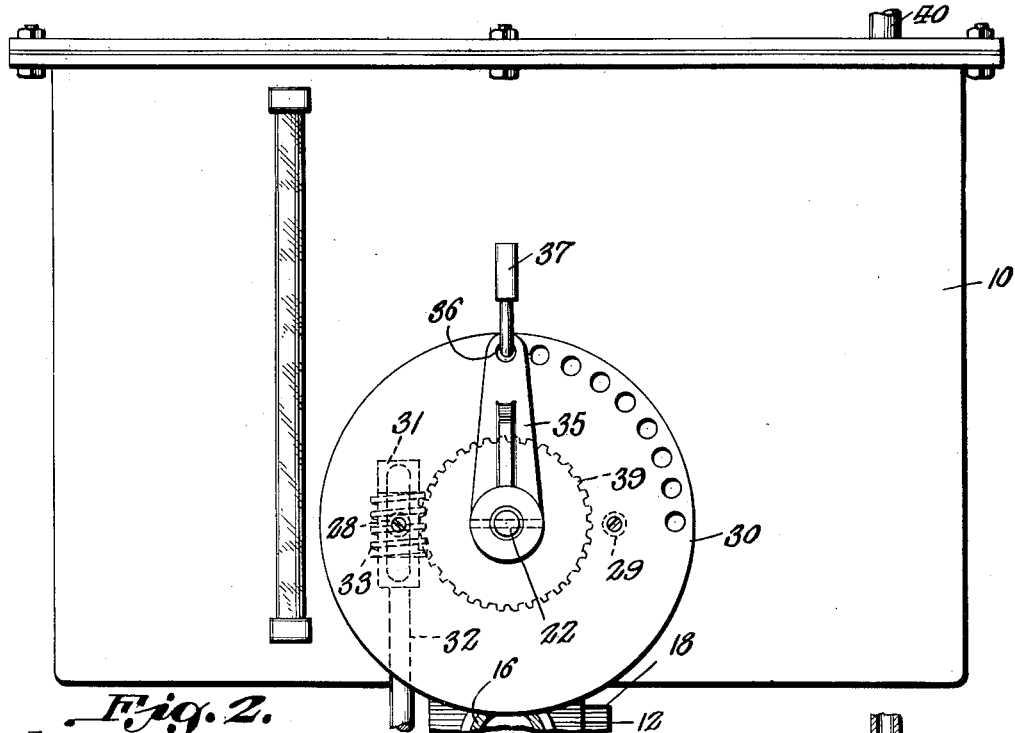
Figure 2 is a front elevation of the tank, showing the indicating dial.
Figure 3:
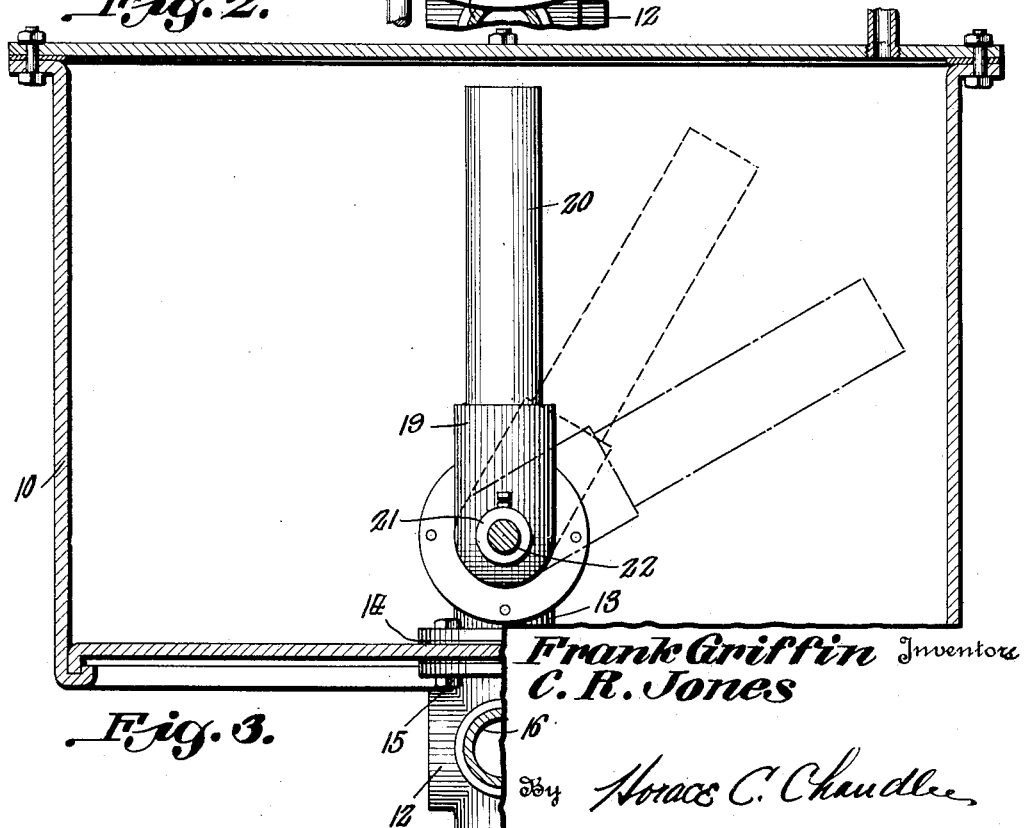
Figure 3 is a horizontal sectional view on the line 3—3 of Figure 1, the overflow pipe being shown in dotted lines in several different adjusted positions.

Referring particularly to the accompanying drawings, 10 represents a tank, of suitable size and proportions, and supported in any suitable manner, said tank having an opening 11 in its bottom wall. Disposed in covering relation to the opening 11, outwardly of said bottom, is one branch of a three-way valve casing 12, while one end of an elbow pipe 13, is disposed in covering relation to said opening, within the tank, suitable packing 14 being disposed between the casing and the said bottom, and between the elbow and the bottom, while clamping bolts 15 are disposed through all of said parts. Connected respectively to the other branches of the valve casing 12 are the pipes 16 and 17, the former of which serves to convey water to the tank, while the latter serves to convey water from the tank, in acordance with the position of the handle 18, of the valve. Swiveled on the other end of the elbow 13, for lateral swinging movement into and out of a vertical position, within the tank, is a second elbow 19, in the vertical branch of which is engaged the overflow pipe 20, while in the curved side of said elbow there is formed a hollow boss 21, in which is removably secured the inner end of a rotatable shaft 22. In the wall of the tank, directly opposite the boss 21, is an opening 23, and secured to the outer face of said wall is a plate 24 having a hollow stem 25, which extends through said opening 23, and rotatably receives said shaft therethrough. The outer face of the plate 24 is provided with an externally threaded boss 26, on which is engaged the cap 27, filled with suitable packing, to form a stuffing box, through which the shaft also extends. Formed on the cap 27, at opposite sides of the boss 26, are the outwardly extending horizontal arms 28 and 29, the outer ends of which have secured thereto the circular dial 30. The arm 29, a short distance inwardly from the dial, is formed with a vertical bearing 31, through which is disposed the vertical shaft 32, having the worm 33 on its upper end, and the hand wheel 34 on its lower end. The shaft 22 extends through the center of the dial and has on its outer end the indicator hand 35, which is adapted to traverse said dial, as will be apparent from the drawings. The outer end of the hand 35 is provided with an opening 36, and the dial, adjacent its periphery, is provided with a circular series of openings, with any one of which the hand opening is adapted to register to receive the shackle of a padlock 37, for the purpose of locking the overflow pipe in any one of its adjusted positions, in accordance with the amount of water it is desired shall flow from the tank, for use in a particular batch of concrete. In the vertical shaft 32 there is arranged a universal joint 38, so that the shaft may be rotated from different positions with respect to the tank. On the shaft 22, and meshing with the worm 33, is a worm wheel 39, whereby the shaft 22 is adapted to be rotated, when the hand wheel of the shaft 32 is turned, for the purpose of setting the overflow pipe 20 in different positions, which positions are indicated by the position of the hand 35, on the face of the dial.

In the top of the tank is an air valve 40, which permits escape of air from the tank, when filling the latter, and to permit entrance of air when emptying the same.

From the foregoing, it will be seen that, upon rotating the hand wheel 34 the shaft 22 will be rotated, whereby to swing the overflow pipe 20 into the proper angular position, away from the vertical, whereby to permit the water to flow from the tank until the level of such water reaches the mouth of said pipe. This represents a certain number of gallons, such number being arranged on the face of the dial, adjacent one of its openings, so that when the padlock is engaged in any one of these openings, and the opening of the indicator hand, the device is set to deliver a predetermined number of gallons of water from the tank. When the water level reaches the mouth of the overflow pipe 20, the operator swings the handle 18 so as to set the valve in a position to close the outlet, and open the inlet, thereby permitting the tank to refill, for another charge, for use with the next batch of materials.

What is claimed is:

A liquid measuring device including a liquid tank having an opening in a wall thereof, a valve connected to said wall, outwardly of the tank, in register with said opening, conduits connected with said valve, a pipe elbow secured to said wall, inwardly of the tank, in register with said opening, a movable pipe elbow swivelly connected with the other end of the first elbow, a pipe connected with and extending from the other end of the swivelled elbow, and a rock shaft supported in a wall of the tank and having an end secured to said elbow at the rocking axis of the latter.

CARADOC R. JONES.
FRANK GRIFFIN.